United States Patent [19]

Suzuki et al.

[11] Patent Number: 5,102,925
[45] Date of Patent: Apr. 7, 1992

[54] AIR-DRYING PAINT

[75] Inventors: Yuji Suzuki, Suita; Tabito Nishimura, Daito; Nobuhiro Sasaki, Neyagawa, all of Japan

[73] Assignee: Nippon Paint Company, Ltd., Osaka, Japan

[21] Appl. No.: 479,900

[22] Filed: Feb. 13, 1990

[30] Foreign Application Priority Data

Feb. 14, 1989 [JP] Japan .................................. 1-34695

[51] Int. Cl.$^5$ ............................................. C08L 67/06
[52] U.S. Cl. .................................... 523/500; 523/502;
523/526; 427/385.5; 427/388.5; 524/313;
525/7.4; 525/38; 525/47; 525/243; 525/445;
525/451; 528/274
[58] Field of Search ...................... 523/500, 502, 526;
427/385.5, 388.5; 524/313; 525/38, 47, 7.4, 243,
445, 451; 528/274

[56] References Cited

U.S. PATENT DOCUMENTS 4,268,547  5/1981  Backhouse ..................... 427/385.5
4,927,877  5/1990  Shibata et al. ..................... 525/7

Primary Examiner—John Kight, III
Assistant Examiner—S. A. Acquah
Attorney, Agent, or Firm—Millen, White and Zelano

[57] ABSTRACT

An air-drying paint composition comprising (a) internally cross-linked polymer microparticles produced by emulsion polymerizing ethylenically unsaturated monomers including at least one cross-linking monomer, (b) a film-forming resin selected from the group consisting of an air-drying alkyd resin, an acrylic polymer and an acrylic-modified alkyd resin, and (c) a volatile organic solvent. The paint may be formulated in high solids content while retaining low viscosity.

8 Claims, No Drawings

AIR-DRYING PAINT

BACKGROUND OF THE INVENTION

This invention relates to an air-drying paint composition for use in coating steel construction, bridges, buildings, cars, machinery and other substrates for protective and/or decorative purposes.

Heretofore, alkyd and acrylic modified alkyd type paints have been widely used as one-pot, air-drying paints. For reasons of avoiding atmospheric pollution and saving natural resources, it has become a social problem today to decrease the amount of solvent discharged to the atmosphere from coating compositions by providing high solids paints having excellent air-drying capability, workability and film properties without unduly increasing the viscosity thereof. Unfortunately, such requirements are often incompatible. For example, high solids, low viscosity paints may be formulated by employing relatively low molecular weight resins and highly active solvents. The use of low molecular weight resins results in prolonged air-drying time and also decrease in film properties such as hardness, solvent resistance and chemical resistance, while the use of highly active solvents increases production costs and often causes lifting phenomena when two or more coats are overlaid. For systems using low cost solvents such as mineral spirit, it is necessary to use alkyd resins having a greater oil length. However, such systems exhibit poor air-drying capability and, therefore, are not capable of applying in two coats within a day during winter.

Japanese Laid Open (Kokai) Patent Application No. 199777/84 discloses an air-drying paint composition comprising an alkyd resin having an oil length greater than 50% and a nonaqueous dispersion of polymer. Although this system is more advantageous than conventional systems free of such nonaqueous dispersion of polymer, it is not entirely satisfactory in respect of viscosity, air-drying capability, film properties including film gloss and workability. Particularly solvents which are more polar than xylene, such as mineral spirit, cannot be used in this system because polymer particles dispersed in the nonaqueous medium become swollen or dissolved.

It is, therefore, an object of the present invention to provide an air-drying paint which is high solids while retaining a low viscosity, and exhibits an excellent air-drying capability even with the use of a relatively high-boiling point, low-volatile solvent such as mineral spirit as well as a good workability and excellent film properties in hardness, water resistance, solvent resistance, chemical resistance, weatherability and the like.

It is another object of the present invention to provide an air-drying paint of the above type which provides a greater film thickness per coat than is possible by conventional paints.

Other objects and advantages of the present invention will be apparent to those skilled in the art as the description proceeds.

SUMMARY OF THE INVENTION

According to the present invention, there is provided an air-drying paint composition comprising (a) internally cross-linked polymer microparticles having an average particle size of 0.01 to 10 microns obtained by emulsion polymerizing a mixture of ethylenically unsaturated monomers at least a portion of which is a monomer having at least two ethylenically unsaturated bonds in the molecule or a combination of two different monomers having mutually reactive groups;

(b) a film-forming resin selected from the group consisting of an air-drying alkyd resin, an acrylic polymer having a number average molecular weight of 10,000 to 100,000, and an acrylic-modified alkyd resin obtained by modifying said alkyd resin with said acrylic polymer and (c) a volatile organic solvent in which said film-forming polymer is soluble and said polymer microparticles are insoluble but stably dispersible;

the ratio of said polymer particles to said film-forming resin in the composition being 98:2 to 1:99 parts by weight on solids content basis, said composition being free from any external cross-linking agent.

The paint composition of the present invention may be formulated in high solids yet retaining a low viscosity level by incorporating said internally cross-linked polymer microparticles (a). This is because the paint formulation incorporating said microparticles (a) has a yield point in its viscosity. Namely, although its apparent viscosity is relatively high in stationary state but decreases upon applying a shear force. Therefore, the paint formulation may be applied to a greater film thickness by a single application without sagging or run than is possible with the corresponding formulation free from said microparticles (a). The polymer microparticles also serve to promote the air-drying capability of the paint formulation owing to their filler effect. In this respect, the resemblance of physical and chemical properties between the polymer microparticles and said film-forming resin result in enhanced properties of dried film composed of said microparticles and the matrix of said film-forming resin including film gloss, hardness, solvent resistance, chemical resistance, weatherability and the like.

Unlike prior art nonaqueous polymer dispersion, the polymer microparticles produced by the emulsion polymerization method may be formulated in systems containing highly polar solvents because they remain intact in such solvents and advantages thereof with respect to said film properties are more remarkable than the nonaqueous polymer dispersion.

DETAILED DISCUSSION

Preparation of Polymer Microparticles

The polymer microparticles used in the present invention may be produced by emulsion polymerizing a monomer mixture of ethylenically unsaturated monomers at least a portion of which is a monomer having at least two ethylenically unsaturated bonds in the molecule or a combination of two different monomers having mutually reactive groups, in an aqueous medium, and then removing said medium by solvent substitution, azeotropic distillation, centrifugation, drying and the like.

The emulsifier used in the emulsion polymerization may be any conventional emulsifier, or a water soluble, amphoteric modified polyester resin disclosed in U.S. Pat. No. 4,322,324 or a water soluble, amphoteric modified epoxy resin disclosed in U.S. Pat. No. 4,379,872, both assigned to the assignee of this application, of which disclosures are incorporated herein by reference.

The monomer mixture comprises at least one ethylenically unsaturated, monofunctional monomer and at least one cross-linking monomer.

Examples of monofunctional monomers include carboxyl group-containing monomers such as acrylic, methacrylic, crotonic, itaconic, maleic and fumaric acids; hydroxy group-containing monomers such as 2-hydroxyethyl acrylate, 2-hydroxyethyl methacrylate, hydroxypropyl acrylate, hydroxypropyl methacrylate, hydroxybutyl acrylate, hydroxybutyl methacrylate, allyl alcohol and methallyl alcohol; nitrogen atom-containing acrylates or methacrylates such as dimethylaminoethyl acrylate or methacrylate; polymerizable amides such as acrylamide and methacrylamide; polymerizable nitriles such as acrylonitrile and methacrylonitrile; alkyl acrylates or methacrylates such as methyl acrylate, methyl methacrylate, ethyl acrylate, n-butyl acrylate, n-butyl methacrylate and 2-ethylhexyl acrylate; polymerizable glycidyl compounds such as glycidyl acrylate or methacrylate; polymerizable aromatic compounds such as styrene, α-methylstyrene, vinyltoluene or t-butylstyrene; α-olefins such as ethylene and propylene; vinyl compounds such as vinyl acetate and vinyl propionate; and diene compounds such as butadiene and isoprene. Mixtures of these monofunctional monomers may also be used.

Cross-linking comonomers include a monomer having at least two ethylenically unsaturated bonds per molecule and a combination of two different monomers having mutually reactive groups.

Monomers having at least two polymerization sites may typically be represented by esters of a polyhydric alcohol with an ethylenically unsaturated monocarboxylic acid, esters of an ethylenically unsaturated monoalcohol with a polycarboxylic acid and aromatic compounds having at least two vinyl substituents. Specific examples thereof include ethylene glycol diacrylate, ethylene glycol dimethacrylate, triethylene glycol dimethacrylate, tetraethylene glycol dimethacrylate, 1,3-butylene glycol dimethacrylate, trimethylolpropane triacrylate, trimethylolpropane trimethacrylate, 1,4-butanediol diacrylate, neopentyl glycol diacrylate, 1,6-hexanediol diacrylate, pentaerythritol diacrylate, pentaerythritol triacrylate, pentaerythritol tetracrylate, pentaerythritol dimethacrylate, pentaerythritol trimethacrylate, pentaerythritol tetramethacrylate, glycerol diacrylate, glycerol allyloxy dimethacrylate, 1,1,1-tris(hydroxymethyl)ethane diacrylate, 1,1,1-tris(hydroxymethyl)ethane triacrylate, 1,1,1-tris(hydroxymethyl)ethane dimethacrylate, 1,1,1-tris(hydroxymethyl)ethane trimethacrylate, 1,1,1-tris(hydroxymethyl)propane diacrylate, 1,1,1-tris(hydroxymethyl)propane triacrylate, 1,1,1-tris(hydroxymethyl)propane dimethacrylate, 1,1,1-tris(hydroxymethyl)propane trimethacrylate, triallyl cyanurate, triallyl isocyanurate, triallyl trimellitate, diallyl phthalate, diallyl terephthalte and divinyl benzene.

Combinations of two monomers having mutually reactive groups may be used in place of, or in addition to monomers having two or more polymerization sites. For example, monomers having a glycidyl group such as glycidyl acrylate or methacrylate may be combined with carboxyl group-containing monomers such as acrylic, methacrylic or crotonic acid.

Other examples of the combination of mutually reactive groups include amine/carbonyl, epoxide/carboxylic acid anhydride, alkyleneimine/carbonyl, amine/carboxylic acid chloride, organo-alkoxysilane/carboxyl and hydroxyl/isocyanate.

The polymer microparticles thus produced by the emulsion polymerization method may be isolated from the aqueous medium by filtering, spray drying or lyophilizing the emulsion and used as such or, if necessary, after pulverizing into a desired particle size using a conventional mill. The aqueous medium may be subjected to azeotropic distillation or solvent substitution with an organic volatile solvent such as xylene and a dispersion of the polymer microparticles in such solvent may be formulated in the paint composition of the present invention.

The polymer microparticles thus produced generally have a mean particle size from 0.01 to 0.6 microns. A mean particle size from 0.02 to 0.5 microns is preferable.

The glass transition point (Tg), solubility parameter and/or refractive index of the polymer microparticles may be controlled in a suitable range relative to those of matrix resin by varying their monomer constituents. The polymer microparticles may have on their surfaces a plurality of functional groups which interact with each other or with those possessed by the matrix resin to promote the interaction between individual polymer microparticles themselves and/or between the microparticles and the matrix resin. The polymer microparticles may also have an agent for promoting the properties of the resulting dried film either being carried on the surfaces or entrapped within the particles.

Film-Forming Resin

The film-forming resin used in the paint formulation of the present invention is selected from (i) an alkyd resin, (ii) an acrylic polymer, or (iii) an acrylic modified alkyd resin, all of which are used in conventional air-drying paint formulations free from cross-linked polymer microparticles.

The term "alkyd resin" as used herein refers to a co-condensation product of a polyhydric alcohol component, a polybasic acid component optionally containing monobasic acid, and a drying, semi-drying or non-drying oil, or the fatty acid component of these oils. Representative polyhydric alcohols include ethylene glycol, propylene glycol, diethylene glycol, dipropylene glycol, butylene glycol, pentanediol, hexanediol, neopentyl glycol, cyclohexanediol, glycerine, trimethylolethane, trimethylolpropane, tris(β-hydroxyethyl)isocyanurate, pentaerythritol, diglycerine, dipentaerythritol, mannitol, sorbitol and the like.

Typical polybasic acids include phthalic anhydride, isophthali acid, terephthalic acid, tetrahydrophthalic anhydride, endomethylenetetrahydrophthalic anhydride, maleic anhydride, fumaric acid, polybutadienedicarboxylic acid, trimellitic acid, succinic acid, adipic acid, sebacic acid, azelaic acid and the like.

Monobasic acids such as benzoic acid and p-t-butylbenzoic acid may be used in conjunction with the polybasic acid component.

Examples of oils and fatty acids include rice oil, tall oil, soybean oil, saflower oil, cotton seed oil, linseed oil, tung oil, dehydrated castor oil, fish oil and fatty acids derived from these oils. These oils and fatty acids preferably have an iodine number greater than 100. Non-drying oils such as palm oil, castor oil and coconut oil may be used in conjunction with drying oils and their fatty acids as desired.

The production of alkyd resins by the polycondensation reaction of the above components is well-known in the art. The resulting alkyd resins should be air-drying and preferably have an oil length greater than 50%.

The term "film-forming acrylic polymer" as used herein refers to polymers of (meth)acrylate monomers alone or in combination with other ethylenically unsaturated monomers. Examples of (meth)acrylate monomers include alkyl (meth)acrylates such as methyl (meth)acrylate, ethyl (meth)acrylate, n-butyl (meth)acrylate, 2-ethylhexyl (meth)acrylate, lauryl (meth)acrylate and nonyl (meth)acrylate; hydroxyalkyl (meth)acrylates such as 2-hydroxyethyl (meth)acrylate and 2-hydroxypropyl (meth)acrylate; alkoxyalkyl (meth)acrylates such as 2-ethoxyethyl (meth)acrylate and 4-methoxybutyl (meth)acrylate; aryloxyalkyl (meth)acrylates such as 2-phenoxyethyl (meth)acrylate and 2-nonylphenoxyethyl (meth)acrylate; cycloalkyl (meth)acrylates such as cyclohexyl (meth)acrylate, cyclopentyl (meth)acrylate and isobornyl (meth)acrylate; cycloalkenyl (meth)acrylates such as dicyclopentenyloxyethyl (meth)acrylate; and aminoalkyl (meth)acrylates such as diethylaminoethyl (meth)acrylate. Examples other ethylenically unsaturated monomer include vinyl acetate, vinyl propionate, acrylonitrile, styrene, vinyltoluene and the like.

The film-forming acrylic polymers may be produced by solution polymerizing the above monomers in an organic solvent used in the paint composition of the present invention as component (c) to have a number average molecular weight from 10,000 to 100,000.

The term "acrylic-modified alkyd resin" as used herein refers to those produced by modifying the above-mentioned alkyd resins with the above-mentioned acrylic polymers.

Paint Composition

The paint composition of the present invention comprises an organic volatile solvent such as those conventionally used in the coating industry. High-boiling point, low volatile, inexpensive solvents such as mineral spirit may be used to obtain an air-drying paint capable of applying in two coats per day even during winter when the polymer microparticles (a) are added thereto. Because the polymer microparticles have been cross-linked and the dispersion stability thereof does not have to rely on a steric barrier of amphipathic polymer chains which are solvated by the solution of a film-forming polymer, they are not soluble in almost all of conventional solvents used in the coating industry and remain stably dispersed even in a system containing relatively active polar solvents.

Examples of useful solvents for this purpose include aliphatic hydrocarbons such as hexane, heptane and octane; mixed hydrocarbons such as mineral spirit, naphtha and kerosene; aromatic hydrocarbons such as toluene and xylene, esters such as ethyl acetate, butyl acetate, butyl cellosolve and ethyl cellosolve, ketones such as acetone, methyl ethyl ketone, methyl isobutyl ketone and cyclohexanone; ethers such as dioxane, diethyl ether and tetrahydrofuran; alcohols such as $C_1$-$C_6$ alkanols and ethylene glycol; and mixtures of these solvents.

The paint composition of the present invention comprises said component (a) and component (b) in a ratio from 98:2 to 1:99, preferably from 95:5 to 2:98, more preferably from 20:80 to 60:40. If the above ratio is too high, the entire composition will exhibit poor film-forming properties. Conversely, if the ratio is too low, the air-drying capability of the composition will not be sufficiently promoted.

The paint composition of the present invention may comprise a variety of conventional additives such as antioxidants, UV absorbers, and also pigments. Pigments may be dispersed in component (b) followed by letting down component (a) or vice versa. Alternatively, they may be dispersed in the mixture of component (a) and component (b).

When component (b) is an alkyd resin or an acrylic modified alkyd resin, the composition may comprise dryers such as octates or naphthenates of metals such as cobalt, lead, manganese, aluminum or rare earth metals as well as anti-skinning agents such as methyl ethyl ketoxime.

The drying mechanism of the present invention solely utilizes the evaporation of solvents and/or auto-oxidation polymerization of film-forming resins at the ambient temperature.

Accordingly, the composition does not have to comprise any external cross-linker such as melamineformaldehyde resin, free or blocked organic polyisocyanates.

It is not known to incorporate polymer microparticles of the described type to paints utilizing such drying mechanism except the above-cited Japanese Laid Open Patent Application No. 199,777/84. However, in this case the microparticles to be incorporated are not in isolated form but in nonaqueous dispersion form and therefore must suffer from various disadvantages as discussed hereinbefore.

The paint composition of the present invention has been proven to be free from such disadvantages.

The following examples are given for illustrative purposes only. All parts and per cents therein are by weight unless otherwise indicated.

PRODUCTION EXAMPLE 1

Emulsifier A

A four liter flask having stirring means, a nitrogen-gas introducing tube, a reflux condenser and a decanter was charged with 213 parts of N,N-bis(hydroxyethyl)-taurine, 404 part of sebacic acid, 308 parts of hexahydrophthalic anhydride, 292 parts of 2-ethyl-1,3-hexanediol, 10 parts of DMF and 24 parts of xylene. The mixture was refluxed and water formed by the reaction was removed as an azeotropic mixture with xylene. The temperature was raised to 200° C. over about 3 hours from the initiation of reflux and the reaction product was cooled to 150° C. Then 500 parts of CARDURA E-10 (glycidyl versatate, Shell Chemical Company) were added dropwise over 30 minutes. The reaction was continued for additional two hours at 150° C. with stirring. An amphoionic group-bearing polyester having an acid number of 40 and a number average molecular weight of 1700 was obtained. The product is hereinafter referred to as "Emulsifier A".

PRODUCTION EXAMPLE 2

Emulsifier B

A four liter flask having stirring means, a nitrogen-gas introducing tube, a reflux condenser and a decanter was charged with 213 parts of N,N-bis(hydroxyethyl)-taurine, 404 part of sebacic acid, 296 parts of phthalic anhydride, 292 parts of 2-ethyl-1,3-hexanediol, 10 parts of DMF and 24 parts of xylene. The mixture was refluxed and water formed by reaction was removed as an azeotropic mixture with xylene. The temperature was raised to 205° C. over about 3 hours from the initiation of reflux and the reaction product was cooled to 160° C. Then 500 parts of CARDURA E-10 (glycidyl versatate, Shell Chemical Company) were added dropwise over 30 minutes. The reaction was continued for additional two hours at 160° C. with stirring. An amphoionic group-bearing polyester having an acid number of 38 and a number average molecular weight of 1710 was obtained. The product is hereinafter referred to as "Emulsifier B".

Polymer Microparticles

PRODUCTION EXAMPLE 3

A two liter flask equipped with stirring means, cooling means, a decanter and temperature-controlling means was charged with 611.5 parts of deionized water and heated to 80° C. Separately, a monomer dispersion was prepared by adding 150 parts of neopentyl glycol dimethacrylate, 101.5 parts of styrene, 50 parts of lauryl methacrylate and 195.8 parts of 2-ethylhexyl methacrylate to a solution of 7.5 parts of dimethylethanolamine and 75 parts of Emulsifier A in 500 parts of deionized water followed by stirring for 15 minutes. To the flask were added dropwise with stirring the above monomer dispersion and a solution of 3.2 parts of dimethylethanolamine and 5.0 parts of azobiscyanovaleric acid in 250 parts of deionized water concurrently over 60 minutes. After the addition of monomers, the mixture was stirred at 80° C. for 60 minutes to give an aqueous dispersion of polymer microparticles having a nonvolatile content of 29.5% and a mean particle size of 75 nm. The dispersion was spray dried to give 569 parts of polymer microparticles as white powder.

PRODUCTION EXAMPLE 4

The same flask as used in production Example 3 was charged with 611.5 parts of deionized water and heated to 80° C. Separately, a monomer dispersion was prepared by adding 100 parts of neopentyl glycol dimethacrylate, 122.6 parts of styrene, 157.5 parts of isobutyl methacrylate, 81.2 parts of 2-ethylhexyl methacrylate and 38.7 parts of methyl methacrylate to a solution of 7.5 parts of dimethylethanolamine and 75 parts of Emulsifier A followed by stirring for 15 minutes. To the flask were added dropwise with stirring the above monomer dispersion and a solution of 3.2 parts of dimethylethanolamine and 5.0 parts of azobiscyanovaleric acid in 250 parts of deionized water concurrently over 60 minutes.

After the addition of monomers, the mixture was stirred at 80° C. for 60 minutes to give an aqueous dispersion of polymer microparticles having a nonvolatile content of 29.7% and a mean particle size of 80 nm. The dispersion was spray dried to give 550 g of polymer microparticles as white powder.

PRODUCTION EXAMPLE 5

The same flask as used in production Example 3 was charged with 611.5 parts of deionized water and heated to 80° C. Separately, a monomer dispersion was prepared by adding 100 parts of neopentyl glycol dimethacrylate, 100 parts of styrene, 213.7 parts of 2-ethylhexyl methacrylate and 86.3 parts of 2-ethylhexyl acrylate to a solution of 7.5 parts of dimethylethanolamine and 75 parts of Emulsifier B followed by stirring for 15 minutes. To the flask were added dropwise with stirring this monomer dispersion and a solution of 3.2 parts of dimethylethanolamine and 5.0 parts of azobiscyanovaleric acid concurrently over 60 minutes. The mixture was stirred at 80° C. for additional 60 minutes after the addition of monomers to give an aqueous dispersion of polymer microparticles having a nonvolatile content of 29.4% and a mean particle size of 72 nm. The dispersion was spray dried to give 565 parts of polymer microparticles as white powder.

EXAMPLE 1

To 295 parts of a 70% solid content solution of a soyabean oil-modified alkyd resin in mineral spirit having an oil length of 64%, a phthalic anhydride content of 22% and a viscosity of Z were added 300 parts of titanium dioxide pigment and 123 parts of mineral spirit. The mixture was milled with the aid of glass beads to divide titanium dioxide particles to less than 20 microns followed by the addition of 2.6 parts of 6% cobalt naphthenate and 25% lead dryer. Then a dispersion of 94 parts of polymer microparticles produced in Production Example 3 in 188 parts of mineral spirit was thoroughly mixed with thus produced paint while stirring in a disper for 5 minutes.

EXAMPLE 2

To 214 parts of the same soybean oil-modified alkyd resin solution as used in Example 1 were added 300 parts of titanium dioxide pigment and 36 parts of mineral spirit. The mixture was milled with the aid of glass beads to divide titanium dioxide particles to less than 20 microns followed by the addition of 1.8 parts of 6% cobalt naphthenate and 4.1 parts of 25% lead dryer. Then a dispersion of 150 parts of polymer microparticles produced in Production Example 3 in 300 parts of mineral spirit was thoroughly mixed with thus produced paint while stirring in a disper for 5 minutes.

EXAMPLE 3

To 459 parts of acrylic polymer solution having a viscosity of Z and a number average molecular weight of 38,000 produced by solution polymerizing 147.1 parts of styrene, 188.9 parts of isobutyl methacrylate, 97.4 parts of 2-ethylhexyl acrylate and 46.4 parts of methyl methacrylate in 514.7 parts of mineral spirit and 71.5 parts of toluene were added 300 parts of titanium dioxide pigment and 7 parts of mineral spirit. The mixture was milled with the aid of glass beads to divide titanium oxide particles to less than 20 microns. Then a dispersion of 94 parts of polymer microparticles produced in Production Example 4 in 140 parts of mineral spirit was thoroughly mixed with thus produced paint while stirring in a disper for 5 minutes.

EXAMPLE 4

124.8 parts of 80% solids content solution of soybean oil-modified alkyd resin having an oil length of 64% and a phthalic anhydride content of 23% in mineral spirit were modied with an acrylic polymer produced from 39.9 parts of styrene, 129.3 parts of isobutyl methacrylate, 11.7 parts of 2-ethylhexyl acrylate and 24.0 parts of lauryl methacrylate, and diluted with 215.7 parts of mineral spirit to give an acrylic-modified alkyd varnish having a viscosity of Z and a number average molecular weight of 9,400. To 375.5 parts of this varnish were added 300 parts of titanium dioxide pigment and 42.5 parts of mineral spirit. The mixture was milled with the aid of glass beads to divide titanium dioxide particles to less than 20 microns followed by the addition of 2.6 parts of 6% cobalt naphthenate and 6.2 parts of 25% lead dryer. Then a dispersion of 94 parts of polymer microparticles produced in Production Example 5 was thoroughly mixed with thus produced paint while stirring in a disper for five minutes.

COMPARATIVE EXAMPLE 1

To 295 parts of the solution of soybean oil-modified alkyd resin used in Example 1 were added 300 parts of titanium dioxide pigment and 201 parts of mineral spirit. The mixture was milled with the aid of glass beads to divide titanium oxide particles to less than 20 microns followed by the addition of 2.6 parts of 6% cobalt naphthenate and 6.2 parts of 25% lead dryer. Then 204 parts of a nonaqueous dispersion of acrylic polymer (HITALLOID TP-100, Hitachi Chemical Co., Ltd., 46% solids content, solvent: mineral spirit/toluene=97/7, mean particle size 700 nm) were thoroughly mixed with thus produced paint while stirring in a disper for 5 minutes.

COMPARATIVE EXAMPLE 2

To 214 parts of the solution of soybean oil-modified alkyd resin used in Example 1 were added 300 parts of titanium dioxide pigment and 160 parts of mineral spirit. The mixture was milled with the aid of glass beads to divide titanium oxide particles to less than 20 microns followed by the addition of 1.8 parts of 6% cobalt naphthenate and 4.1 parts of 25% lead dryer. Then 326 parts of the nonaqueous acrylic polymer dispersion used in Comparative Example 1 were thoroughly mixed with thus produced paint while stirring in a disper for 5 minutes.

COMPARATIVE EXAMPLE 3

To 429 parts of the solution of soybean oil-modified alkyd resion used in Example 1 were added 300 parts of titanium dioxide pigment and 271 parts of mineral spirit. The mixture was milled with the aid of glass beads to divide titanium oxide particles to less than 20 microns followed by the addition of 3.6 parts of 6% cobalt naphthenate and 12.4 parts of 25% lead dryer. Thus produced paint was throughly mixed in a disper with stirring for 5 minutes.

Evaluation of Paint Formulations

The paint formulations produced in Examples 1–4 and Comparative Examples 1–3 were tested for various properties. The film properties were determined with a polished steel plate coated with the test paint to a dry film thickness of 50 microns after allowing to stand the coated plate in the atmosphere at 20° C. at an RH of 70% for 1 month. The results obtained are shown in the table below.

| Test Item | Paint Properties Paint Formulation | | | | | | |
|---|---|---|---|---|---|---|---|
| | Ex. 1 | Ex. 2 | Ex. 3 | Ex. 4 | Comp. 1 | Comp. 2 | Comp. 3 |
| 1) Viscosity, cps | 180 | 230 | 600 | 720 | 260 | 700 | 200 |
| 2) Workability | Good | Good | Good | Good | Good | Not Good | Good |
| 3) Run | Good | Very Good | Very Good | Very Good | Good | Good | Not Good |
| 4) Drying Time | | | | | | | |
| Finger Test, hour | 2 | 2 | 1 | 1.5 | 3 | 2 | 5 |
| Semi-drying, hour | 5 | 3 | 2 | 3 | 6 | 4 | 15 |
| JIS drying time, hour | 15 | 7 | 4 | 5 | 18 | 12 | 48 |
| 5) Storage Stability | | | | | | | |

Remarks

1) B-type viscometer, at 60 rpm.
2) Application to the same wet film thickness by brushing.
  Good: The brush may be moved smoothly without stagnation and threading is not observed.
  Not Good: The brush may be moved stagnantly only with greater force.
3) The maximum wet film thickness without causing run is determined on a vertically standing substrate.
  Very Good: >120 microns.
  Good: <80 microns.
  Not Good: <50 microns.
4) Films applied by a 10 mil applicator at 5° C. at RH of 50% RH.
5) Storage at 20° C. for 1 month.
  Good: No increase in viscosity.
  Not Good: Slight increase in viscosity.

| Test Item | Film Properties Paint Formulation | | | | | | |
|---|---|---|---|---|---|---|---|
| | Ex. 1 | Ex. 2 | Ex. 3 | Ex. 4 | Comp. 1 | Comp. 2 | Comp. 3 |
| 6) 60° gloss | 90 | 87 | 85 | 88 | 64 | 50 | 90 |
| 7) Erichsen, mm | 10.7 | 10.5 | 9.5 | 10.2 | 8.5 | 9.5 | 9.6 |
| 8) Impact Strength, mm | 0 | 5 | 0 | 0 | 10 | >20 | 0 |
| 9) Pencil Hardness | 2B | B | H | B | F | B | 2B |
| 10) Water Resistance | 8 | 7 | 9 | 9 | 4 | 0 | 0 |
| 11) Acid Resistance | Good | Good | Good | Good | Good | Good | Good |
| 12) Alkali Resistance | Good | Good | Good | Good | Good | Good | Good |
| 13) Weatherability | Good | Good | Good | Good | Good | Good | Not Good |

Remarks

6) Films applied on a polished steel plate by a standard applicator.
7) Drawing depth at which films begin to crack or peel off.
8) Dropping ball test according to JIS K 5400 6.13.3. A steel ball of ½ inch diameter weighing 500 g is dropped at a height of 30 cm. Width of peeled area is determined using standard adhesive tape.
9) According to JIS K 5400 6.14.
10) Test films are soaked in tap water for 4 days at 20° C. and then cross-cut is made in depth down to the substrate surface dividing into a plurality of sections of 5×5 mm. Percents peeled area are determined using standard adhesive tape and graded according to the following schedule.

0% = 10; <5% = 8; 6–25% = 6; 26–50% = 4; 51–75% = 2; >76% = 0

11) According to JIS K 5400 7.5. Test film are soaked in 30% $H_2SO_4$ for one day.
  Good: Blisters, cracks, exforiation or erosion are not found in the film.
12) According to JIS K 5400 7,4. Test film is soaked in 5% NaOH for one day.
  Good: As same as the acid resistance.
13) According to JIS K 5400 6.17 for 200 hours.
  Good: Discoloration, blisters, chalking or decrease in gloss are not found in the film.
  Not Good: Discoloration and decrease in gloss are found slightly.

We claim:

1. An air-drying paint composition comprising
  (a) internally cross-linked polymer microparticles having an average particle size of 0.01 to 0.6 microns obtained by emulsion polymerizing a mixture of ethylenically unsaturated monomers at least a portion of which is a monomer having at least two ethylenically unsaturated bonds in the molecule or a combination of two different monomers having mutually reactive groups;
  (b) a film-forming resin selected from the group consisting of, an acrylic polymer having a number average molecular weight of 10,000 to 100,000, and an acrylic-modified alkyd resin obtained by modifying an air drying alkyd resin with said acrylic polymer and
  (c) a volatile organic solvent in which said film-forming polymer is soluble and said polymer microparticles are insoluble but stably dispersible;
  the ratio of said polymer micro particles to said film-forming resin in the composition being from 98:2 to 1:99 parts by weight on solids content basis, said composition being free from any external cross-linking agent.

2. The air-drying paint composition according to claim 1, wherein said film-forming resin is an acrylic polymer having a molecular weight of 1,000 to 100,000 produced by solution polymerizing a mixture of ethylenically unsaturated monomers at least a portion of which is an alkyl acrylate or methacrylate in said volatile organic solvent.

3. The air-drying paint composition according to claim 1, wherein said film-forming resin is an acrylic-modified alkyd resin produced by modifying an oil-modified alkyd resin having an oil length of greater than 50% with an acrylic polymer having a molecular weight of 1,000 to 100,000 produced by solution polymerizing a mixture of ethylenically unsaturated monomers at least a portion of which is an alkyl acrylate or methacrylate in said volatile organic solvent.

4. The air-drying paint composition according to claim 3 further comprising an organic metal dryer.

5. The air-drying paint composition according to claim 1, wherein said volatile organic solvent is mineral spirit.

6. The air-drying paint composition according to claim 1, wherein said ratio is from 95:5 to 2:98.

7. The air-drying paint composition according to claim 1, wherein said ratio is from 20:80 to 60:40.

8. The air-drying paint composition according to claim 1 further comprising a pigment.

* * * * *